July 5, 1966    J. B. ROGERS    3,259,346
POLE HOLDER FOR BOAT OR DOCK
Filed Sept. 29, 1964

John B. Rogers
INVENTOR.
BY
Attorneys

United States Patent Office 3,259,346
Patented July 5, 1966

3,259,346
POLE HOLDER FOR BOAT OR DOCK
John B. Rogers, 2416 E. 24th St., Odessa, Tex.
Filed Sept. 29, 1964, Ser. No. 400,157
1 Claim. (Cl. 248—42)

This invention relates to an improved holder for a fishing rod or a pole and which is functionally designed and structurally adapted to be mounted on a fishing boat gunnel or, alternatively, on a rail or other stationary component part of a dock or pier, or anchored in a fishing bank at the water's edge, as the case may be.

An object of the invention is to provide a holder having features not present in prior art rod holders and, in so doing, to offer fishermen a novelly distinct adaptation which can be unequalifiedly endorsed for use by manufacturers and retailers and which adequately serves the overall purposes for which it is advocated and intended.

Briefly, this invention comprises adapter means which lends itself to readily attachable use on the boat's gunnel and which provides a reliable mounting fixture for a simple rod-type standard or post, the latter being provided at its upper end with a socket-like holder for the readily applicable and removable handle portion of the fishing rod or pole.

The adapter or mounting fixture comprises a screw-threaded flanged bushing which can be clamped in a hole provided therefor in the gunnel or rail and which is accordingly attachable and detachable. The bore of the bushing provides a suitable bearing. The lower portion of the standard is fashioned into a spindle or journal and removably and rotatably seated in the bearing. The upper portion provides a simple post and the pole holding sleeve or socket is perched and fixed at an oblique angle atop the standard.

Experience has shown that a holder constructed as herein disclosed solves certain of the problems of the user. For example, many boats which are currently built for fishing, except row boats, are no longer equipped with oar locks. With the herein disclosed construction and arrangement the user can bore a suitable hole and fit the adaptable mounting fixture therein and thus provide a ready-to-serve place for the attachable and detachable standard (or post) and properly angled pole holding sleeve or socket.

Then, too, it should be noted that the adapter or fixture, once it is properly anchored is firm and affords good anchorage for the spindle portion of the simple rod-type standard. More particularly, the cylindrical sleeve is fixedly welded and perched atop the upper mitered end of the standard, assumes and maintains the desired oblique angle. Any pull or jerk on the baited line tends to tighten the handle in the socket. It is virtually impossible for the pole or fishing rod to accidentally dislodge itself.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
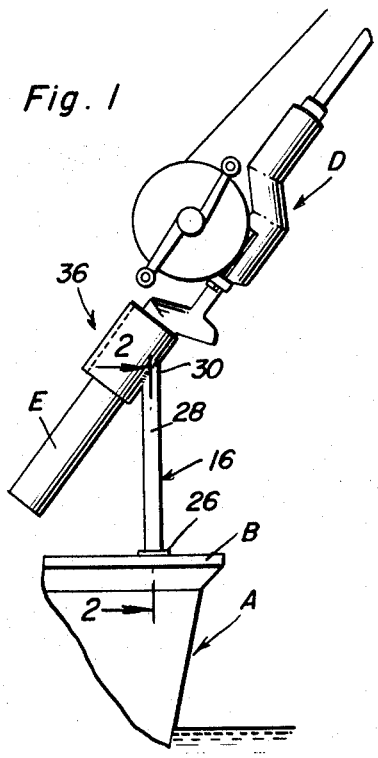
FIG. 1 is a view showing a fragmentary portion of a boat having a rail or gunnel supporting the improved holder and showing the handle portion of the fishing rod removably supported in said holder.
Figure 4:
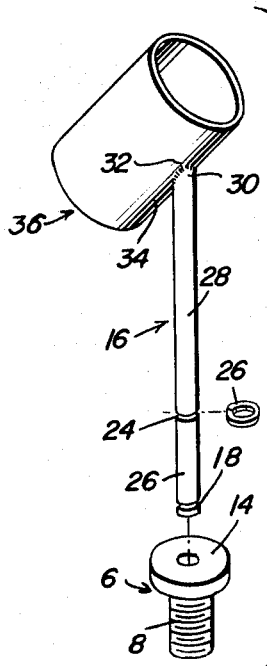
FIG. 4 is an exploded perspective view showing the primary component parts in relation to each other.
Figure 5:
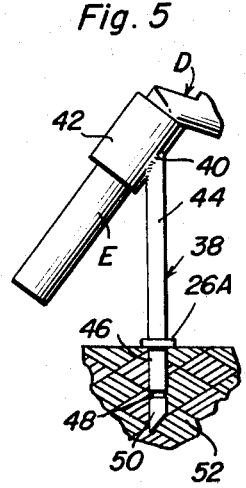
FIGURE 5 is a view similar to FIG. 1 showing a modification wherein the lower end of the rod or standard is pointed and fashioned into an anchoring stack capable of being forcibly pressed and anchored in a fishing bank or equivalent foundation.

With reference first to FIG. 1 the support means comprises a boat A having a rail or gunnel B. In practice this rail or gunnel is provided with a hole C to accommodate the holder and its attaching means. The fishing rod is denoted at D in FIG. 1. This fishing rod could, of course, be a simple pole and the handle portion thereof is denoted at E.

Figure 2:
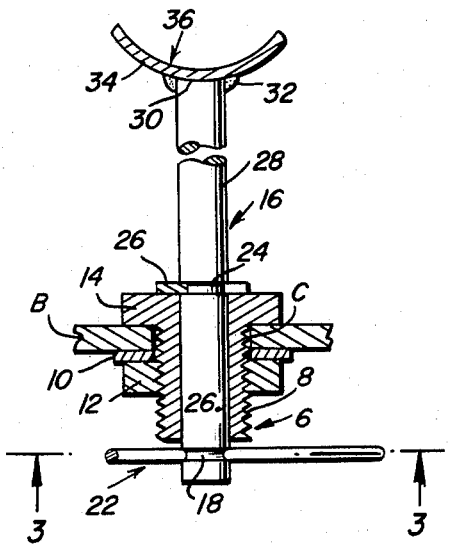
FIG. 2 is a view on an enlarged scale and appearing in elevation and section and taken on the plane of the vertical section line 2—2 of FIG. 1.
Figure 3:
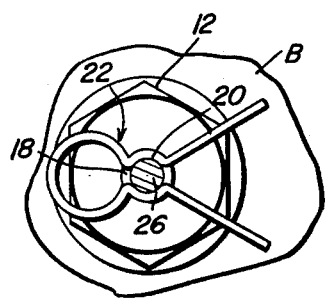
FIG. 3 is a section on the horizontal line 3—3 of FIG. 2.

The holder comprises adapter means, that is, means which can be adaptably fitted into the hole C. More specifically this means comprises a bushing 6 which is suitably adapted to fit into the hole and which has its exterior screw-threaded at 8 to accommodate an encirling washer 10 and an assembling and clamping nut 12. The bushing is passed downwardly through the hole C and the washer and nut applied and clamped in place as suggested in FIG. 2. The upper end of the bushing is provided with an outstanding flange 14 which resides atop the support and is held in place. This flanged bushing and clamping nut provides a readily applicable and removable mounting. It can be left in place or, if desired can be removed and carried about by the user.

The complemental unit, which constitutes the holding means for the rod D is denoted by the numeral 16. It comprises a rigid simple rod which constitutes an attachable and detachable post. This rod is circular in cross-section and smooth surfaced. It is provided at its lower end with an endless groove 18 to accommodate the encircling collar portion 20 of an attachable and detachable cotter key or an equivalent retainer 22. The median portion of the rod is provided with a groove 24 to accommodate an attachable split ring or collar 25 which constitutes a limit stop shoulder. The portion of the rod between the two grooves provides a spindle or journal 26 which is rotatable in the bore of the bushing. This bore provides satisfactory bearing and the cross-section of the journal 26 and inner diameter of the bore may be such that there is a tight fit or loose fit depending on whether the overall post 16 is to be freely rotatable or snug fitted and turnable only by applied effort of the fisherman. That portion of the rod above the collar provides the post or standard proper which is denoted at 28. The upper end of the standard is mitered as at 30 and is welded at 32 to the median or central portion of the underneath part or bottom 34 of a cylindrical open ended sleeve 36. This sleeve as is evident in FIG. 1 provides a socket-type holder for the handle portion of the rod. The sleeve thus fixed and perched atop the mitered post assumes an upwardly inclined position which supports the fishing rod at the approximate upwardly outwardly inclined fishing angle shown in FIG. 1.

Once the rod is located in the holding socket 36 it is bound and lodged in place in the sense that regardless of any pull or jerk exerted on the fishing line by the fish, the rod remains in place and therefore cannot be dislodged. On the other hand when the fisherman desires to play the fish after the fish has taken the hook it is evident that the rod can be lifted out of the holder and handled to land the catch.

Experience has shown that when the holder is attached to a boat or rail of a dock it is reliable and well serves the purposes intended. When applied to a boat its presence thereon will not damage the boat. The fishing rod or pole is nicely supported at the desired upwardly outwardly disposed angle for best fishing results.

Referring now to the modification appearing in FIG.

5 it will be noted that the upper end of the standard or rod 38, that is the mitered end 40 is connected to the median bottom portion of the open-ended sleeve 42. Also, the median portion of the rod 44 is provided with a washer 26A corresponding to the aforementioned washer 26. That portion below the washer is fashioned into a shank 46 having a groove 48 for the aforementioned cotter key or retainer 22. In this arrangement the cotter key is of course not used. Accordingly, the portion below the groove, that is the lower terminal 50 is mitered or beveled or otherwise fashioned into a pointed ground penetrating stake. It follows that if one desires to use the invention in the ground or fishing bank 52, all that is necessary is to force the shank 46 and pointed lower end 50 into the ground and anchor the standard 38 so that it assumes the position shown to accommodate the fishing rod B and more particularly the handle portion E.

It is submitted that careful consideration of the specification and the claims in conjunction with the views of the drawing will enable the reader to obtain a clear and comprehensive understanding of the construction and oriented coordination of the component parts as well as the features and advantages and manner of attaching and using the invention. Accordingly, a more extended description is thought to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A holder for a fishing rod comprising a rigid vertically elongated rod constituting a standard, said rod having an upper end which is mitered, holding means for a fishing rod comprising a relatively short rigid one piece open-ended cylindrical sleeve, a median bottom portion of said sleeve being welded atop the mitered upper end of said rod and said sleeve providing an oblique angled socket with open-ended half-portions projecting beyond diametrically opposite sides of the centered depending rod, the lower end of said standard being also mitered and thus designed and adapted to be forcibly shoved into a fishing bank or the like for anchorage, said rod being provided on a median portion thereof with a first groove, said groove being endless and at right angles to the longitudinal axis of the rod, a readily attachable and detachable split collar mounted on said rod by way of said groove, said collar projecting beyond the surfaces of the rod and providing a stop shoulder, said rod being provided at a downwardly disposed longitudinally spaced point with a second encompassing groove, said last-named groove being adapted to accommodate a readily attachable and detachable cotter key, that portion of the rod between said grooves constituting a spindle and being adapted, if desired, to be removably and clampingly mounted in a relatively stationary bushing.

References Cited by the Examiner

UNITED STATES PATENTS

| | | | |
|---|---|---|---|
| 2,652,999 | 9/1953 | Lohmar | 248—42 |
| 2,686,077 | 8/1954 | Upton | 296—95 |
| 2,912,196 | 11/1959 | Johnson | 248—42 |
| 2,981,509 | 4/1961 | Messenger et al. | 248—42 |
| 3,065,003 | 11/1962 | Whitehouse | 287—20 |
| 3,145,005 | 8/1964 | Wester | 248—40 |
| 3,180,388 | 4/1965 | Newcomer et al. | 151—69 |

CLAUDE A. LE ROY, *Primary Examiner.*

CHANCELLOR E. HARRIS, *Examiner.*

R. P. SEITTER, *Assistant Examiner.*